July 15, 1958
J. A. HEIDEN
2,843,249
APPARATUS FOR SPACING WORKPIECES
Filed Dec. 29, 1954
2 Sheets-Sheet 1
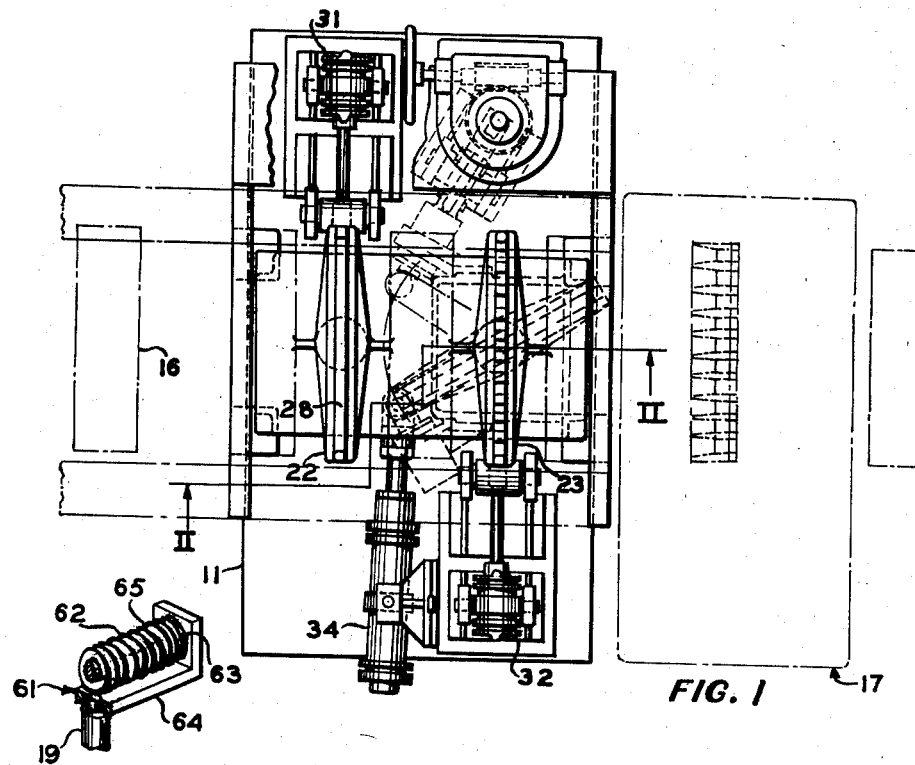
FIG. 1
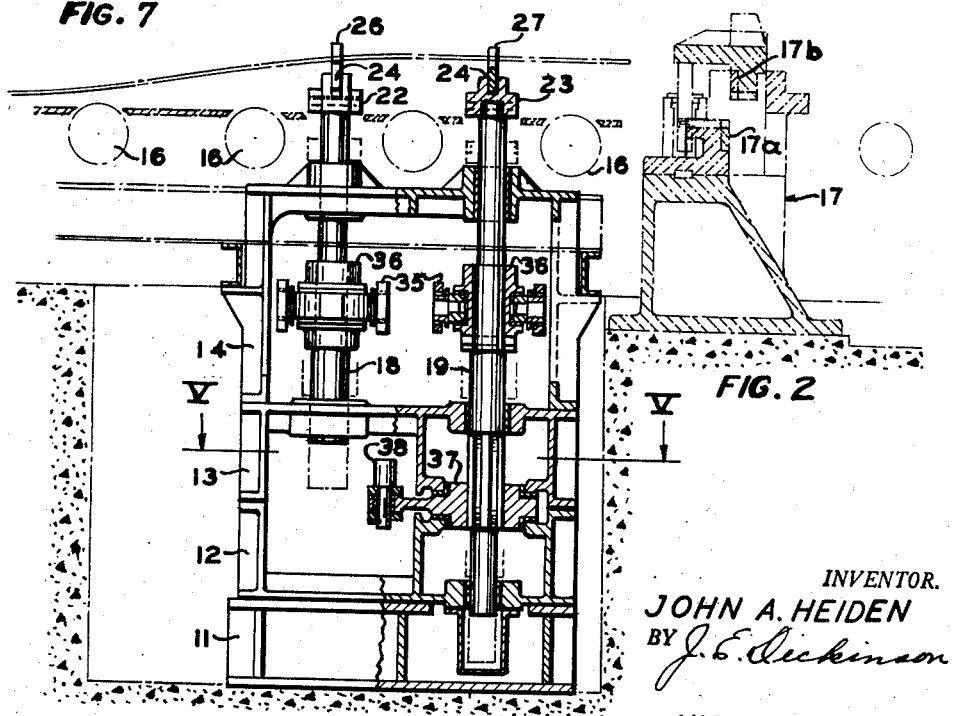
FIG. 7
FIG. 2
INVENTOR.
JOHN A. HEIDEN
BY J. E. Dickinson
HIS ATTORNEY July 15, 1958
J. A. HEIDEN
2,843,249
APPARATUS FOR SPACING WORKPIECES
Filed Dec. 29, 1954
2 Sheets-Sheet 2
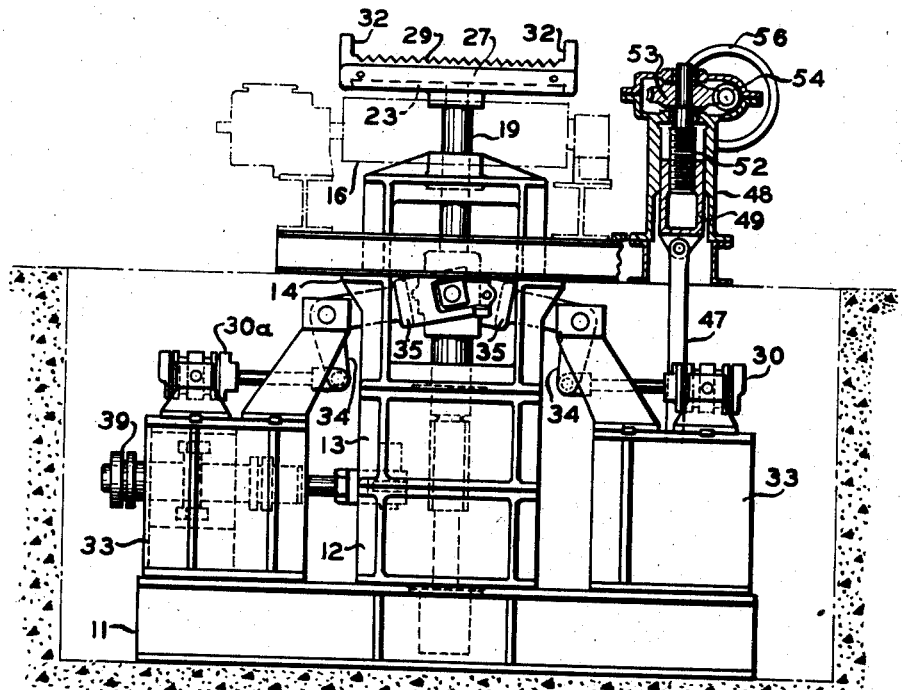
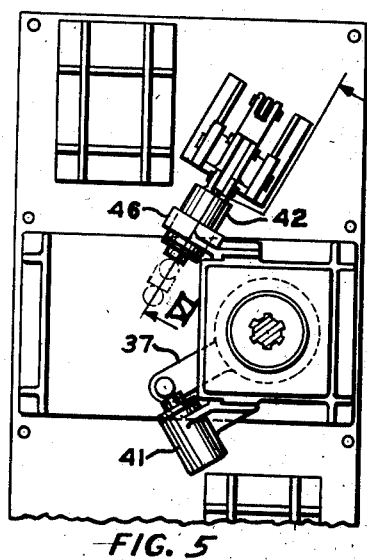
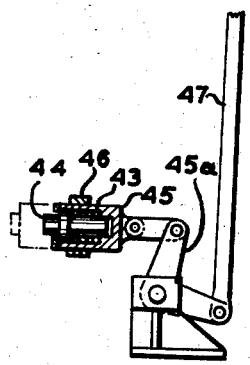
INVENTOR.
JOHN A. HEIDEN
BY J.E. Dickinson
HIS ATTORNEY United States Patent Office 2,843,249
Patented July 15, 1958

2,843,249
APPARATUS FOR SPACING WORKPIECES

John A. Heiden, Pittsburgh, Pa., assignor to United Engineering and Foundry Company, Pittsburgh, Pa., a corporation of Pennsylvania Application December 29, 1954, Serial No. 478,458

11 Claims. (Cl. 198—29)

This invention relates to a method of and apparatus for spacing in a uniform fashion a plurality of workpieces transversely across a conveyor and in particular to a device for use in spacing rods, bars and the like which are to be fed in a uniformly spaced manner into a processing apparatus adjacent to the delivery end of said conveyor.

In processing rolled metallic elongated objects such as rods, bars and the like it becomes necessary as one of the operations to collect a group of the objects on a table as the objects issue from a rolling mill cooling bed and then, for example, shear the workpieces as a transversely uniformly spaced group into a number of shorter lengths. Heretofore, it has been the practice to arrange the workpieces manually across the conveyor in order to line up the leading ends of the workpieces with the serrated cutting edges of the shear so that the workpieces can be fed through the proper serrated portions of the shear and subsequently severed into shorter lengths. It is to be appreciated that such a manual operation is not only time consuming but is also inconvenient to carry out inasmuch as it becomes necessary to reach across the conveyor table in order to arrange the workpieces.

One of the objects of this invention therefore is to provide a method of and apparatus for transversely arranging in a uniformly spaced relationship a plurality of workpieces placed as a group upon a conveyor table immediately in front of a shear or other processing apparatus.

Still another object of this invention is to provide a workpiece spacing device having a spacing element extending transversely across the conveyor and provided with a series of uniformly arranged grooves or serrations extending therealong.

Still another object of this invention is to provide a bar or rod spreading device which is automatic and highly efficient in operation and relatively inexpensive to construct and maintain.

These objects, as well as the various other novel features and advantages of this invention, will become apparent from the following description and accompanying drawings of which:

Figure 1 is a plan view of a rod and bar spreading device embodying the features of the invention herein disclosed and shown in combination with a down-cut shear the cutting edges of which are serrated to provide a series of uniformly spaced notched portions into each of which a single workpiece is received;

Figure 2 is a partial elevational view taken at line II—II of Figure 1;

Figure 3 is a partial sectional view of the lifting head of the apparatus shown in Figure 1;

Figure 4 is an end elevation partly in section taken at line IV—IV of Figure 1;

Figure 5 is a sectional view taken at line V—V of Figure 2;

Figure 6 is a partial view of an adjustable stop means embodied in the apparatus shown in Figure 1, and Figure 7 is a perspective view of a modified workpiece lifting and guiding element for use in combination with the apparatus shown in Figure 1.

With reference in particular to the drawings Figures 1, 2 and 4, the rod and bar positioning and spreading device as therein illustrated comprises a base 11 upon which there is mounted in superimposed relationship a plurality of frames 12, 13 and 14 which form a rigid housing extending to an elevation which is slightly below the lower surface of the rollers of a rod and bar shear entry table and conveyor 16. Adjacent to the housing there is a shear 17 having interchangeable tapered knives the bottom one 17a of which is provided at its upper edge with a series of serrated or notched cutting portions which extend in a uniformly spaced relationship along the length of the knife and within which notches workpieces such as rods, bars or other similar elongated objects are received and nested for cutting into shorter lengths by a similar upper knife 17b also provided on its lower edge with a similar series of serrated or notched cutting edges which match those of the lower knife head and which cooperate therewith for severing the workpieces positioned therebetween.

The frames are provided with aligned bases into which there is received a pair of vertical shafts 18 and 19 arranged on the same longitudinal center line between the rollers of conveyor 16 as shown particularly in Figures 1 and 2. At the upper ends of the shafts 18 and 19 there are mounted heads 22 and 23 respectively which extend transversely across the conveyor and parallel to the table rollers and to the knives of the shear. In each of the heads 22 and 23 there is machined a slot 24 within which workpieces engaging elements 26 and 27 respectively, as shown in Figure 2, are removably mounted. The element 26 is provided with a plain horizontal surface 28 while element 27 throughout its length is provided with a series of uniformly spaced serrated or notched openings 29, the spacing of the notches corresponding to the notched cutting edges of the shear knives. Elements 26 and 27 are provided with upwardly extending end projections 31 and 32 respectively as best shown in Figures 3 and 4. The knives of the shear are adapted to be readily removed and replaced by others in order that the serrated cutting edges thereof will be properly spaced to accommodate a particular size and shape of workpiece being processed. For the same reason, the element 27 may be readily replaced by another having proper sized and spaced notches for accommodating the workpieces then being supplied thereto.

The shafts 18 and 19 are raised and lowered by means of individual piston cylinder assemblies 30 and 30a, the cylinders of both assemblies being mounted upon supports 33 and connected to their respective shafts by means of bell cranks 34 having bifurcated portions at the outer ends of the upper arms which engage with sleeves 36 secured to the shafts 18 and 19. The frames within which the vertical shafts are mounted are provided with suitable spaced bushings through which the shafts extend for sliding movement with respect thereto. It will be noted that the shaft 19 is somewhat longer than the shaft 18, the lower end of shaft 19 being splined for a portion of its length for engaging with similar splines of a rotatable sleeve 37 mounted near the lower end of the frame. The sleeve 37 is provided with an outwardly extending projection 37a having an opening therethrough into which there is received one end of a pin 38 which serves to connect the piston rod of a piston cylinder assembly 39 to the sleeve 37; the cylinder of the piston cylinder assembly 39 being mounted on the support 33. On actuation of the piston of the assembly 39 the shaft 19 and the head 23 carried at the upper end thereof may be oscillated about an arc in a clockwise or counterclockwise direction.

In order that the amount of rotation of the head 23 will be controlled so as not to pass through an arc greater than that which will be desired, an adjustable and a stationary stop are provided as shown in Figures 1, 4, 5 and 6. The stop 41 is mounted in the same horizontal plane as the pin 38 so that as the sleeve 37 is rotated it engages with the stop 41 and thus prevents the head 23 from turning beyond a certain point. Opposite to the sleeve 37 and in the same vertical plane there is an adjustable stop 42 which includes a compression spring 43 as shown in Figure 6, the spring encircling a plunger 44 encased in a housing 45 secured to a bracket 46. The housing 45 is connected to a bifurcated lever arm 45a of a bell crank and a vertical link 47 is connected to the lever 45b thereof. The link 47 in turn extends upward to a frame 48 and is connected at its upper end to an adjustable slide 49. The slide 49 is threaded for a portion of its length to threadably engage a shaft 52 having keyed thereto a worm wheel 53 which meshes with a worm 54 the shaft of which is provided with a hand wheel 56 for rotating the worm and wheel. Thus, by raising or lowering the link 47, the stop 42 may be adjusted to the position desired.

In Figure 7 there is shown in perspective a spreader head 61 which is a modified form of the head 23 shown in Figures 1 and 2. The head 61 comprises an idler roller 62 mounted at both ends in bearings 63 which in turn are supported upon a base 64 secured at its center to the top of the shaft 19. Transversely equally spaced grooves 65 are machined in the roll and are somewhat similar to the serrations formed in the element 27 theretofore described. For spacing transversely rods or bars placed upon the conveyor, the head 61 is operated in a fashion similar to that employed for the head 23 and as hereinafter described. However, when the head 61 is lowered with the bars or rods resting in the grooves of the roller 62, the roller serves both as a conveyor roll and as an active guide.

The operation of the device herein disclosed embodying the features of the present invention may be briefly summarized as follows: A group of workpieces is collected on the shear entry table or conveyor 16 in a side-by-side relationship and conveyed to a position above the heads 22 and 23, with the forward ends thereof extending beyond the turning head 23. When the workpieces are received in such position, the head 22 is first raised by actuation of the piston cylinder assembly 31 to lift the group of workpieces off the table rollers adjacent to the lifting head 22. Following this operation the head 23 is raised to cause the projections 32 of the element 27 to extend upwardly into a horizontal plane passing through the center of the group of workpieces but with the serrations thereof sufficiently below the workpieces so as not to touch them. In this position the head 23 is rotated to cause the projections 32 to engage with and group or pack the workpieces closely together, the stop 42 having been pre-set to insure the proper stopping position of the element 27. The lifting head 22 is then lowered so that the workpieces extending across the element 27 will now be deposited thereon and, as packed together, so related to the slots 29 that when the head 23 is rotated back to its original position the workpieces will lower themselves into the spaced slots 29 and thereby be uniformly spaced with respect to one another across the conveyor table. The head 23 is then lowered to its original position and, with the workpieces extending through the spaced slots thereof, will direct the leading ends of the workpieces into the proper serrated cutting openings of the lower knife of the shear 17. Although not shown, there may be an adjustable stop beyond the delivery side of the shear for interrupting movement of the workpieces in order that they will be cut into uniform desired lengths.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. Apparatus for use in combination with a roller feed table upon which a plurality of elongated workpieces are deposited comprising a rotatable shaft, a spacer head normally parallel to the rollers of said table, carried by said shaft and having a plurality of notches extending across the length thereof, means for raising and rotating said head to an angular position with respect to said rollers, means engageable with said workpieces for packing them closely adjacent one another and in a clearly defined relationship with respect to the notches in said head whereby on rotation of said head to its original position the workpieces will drop into the notches of said head thereby to space themselves across said table.

2. Apparatus according to claim 1 in which the means for engaging and packing the workpieces together includes an upwardly extending projection secured to either end of said head.

3. Apparatus according to claim 1 including a lifting head adapted to engage with and raise the workpieces to a position out of contact with said notched head.

4. Apparatus according to claim 1 in which the notches of said spacer head are uniformly spaced along the length thereof.

5. Apparatus according to claim 1 in which separate means are included and operably arranged to rotate said head.

6. Apparatus according to claim 1 in which there is included an adjustable stop for limiting the rotational movement of said spacer head.

7. Apparatus according to claim 1 in which there is included an adjustable stop and a stationary stop for limiting the rotational movement of said spacer head.

8. Apparatus for uniformly spacing workpieces in a transverse direction with respect to a roller type conveyor on which they are placed comprising a non-rotatable support having a workpiece lifting head secured to the upper portion thereof, a rotatable support having a workpiece spacer head secured to the upper portion thereof and normally parallel to the rollers of said conveyor, upwardly extending projections secured adjacent the outer ends of said spacer head, means for raising said lifting head thereby to lift the workpieces from the rollers adjacent thereto, means for raising said spacer head to place the projections thereof transversely of said workpieces, means for rotating the spacer head to engage the projections thereof with the workpieces thereby to pack the workpieces closely adjacent one another and in a clearly defined relationship with respect to the notches of said head whereby on lowering said lifting head and rotating said spacer head to its original position the workpieces will drop into the notches and thereby space themselves uniformly across said table.

9. An apparatus for spacing transversely a plurality of workpieces for feeding into spaced processing means of a subsequent arranged apparatus comprising in combination with a conveyor means, a frame, two spaced apart vertically extending shafts supported within said frame, a transversely extending lifting head supported by one shaft and a spacer head supported by said other shaft and normally positioned below said conveyor, said spacer head arranged adjacent said processing means and having a pair of upwardly extending end projections and provided with a series of serrations spaced across its workpiece engaging surface, the spacings of said serrations corresponding to the spacing of the processing means, means connected to said lifting head shaft for raising the head supported thereby into engagement with the workpieces to lift at least the front portions thereof from said conveyor, means for raising said spacer head to position said projections thereof transversely and in the plane of said workpieces, means for rotating said spacer head when in the raised position to engage the projections thereof with the workpieces and to force them together, into a side-by-side relationship, means for controlling the extent of rotation of said spacer head, said lifting head adapted to be lowered to deposit said worpieces adjacent the serrations of said head thereby to so position said workpieces that on rotation of said spacer head to its initial position a workpiece will be received by each of said serrations adjacent thereto thus transversely spacing said workpieces at their leading ends.

10. An apparatus for spacing transversely a plurality of workpieces according to claim 9 in which the spacer head is rotatable about a horizontal axis and is provided with a plurality of circular parallel grooves along the length thereof.

11. Apparatus for spacing transversely a plurality of workpieces positioned upon conveyor means for feeding into spaced processing means comprising in combination with said conveyor means a workpiece spacer head, spaced projections extending outwardly and upwardly from said head and adapted to receive individual workpieces therebetween, and means secured to and for raising said head to extend said projections from a position beneath to a position above the surface of said conveyor thereby to engage the leading end portions of said workpieces therebetween thus to space said workpieces uniformly with respect to one another transversely of said conveyor.

References Cited in the file of this patent
UNITED STATES PATENTS

| | | |
|---|---|---|
| 383,000 | Morgan | May 15, 1888 |
| 2,602,554 | Griffith | July 8, 1952 |